(12) United States Patent
Zema

(10) Patent No.: US 7,274,164 B2
(45) Date of Patent: Sep. 25, 2007

(54) ELECTRONIC CONTROL SYSTEM FOR OPERATING GROUPS OF A VEHICLE

(75) Inventor: Massimo Zema, Pisa (IT)

(73) Assignee: Piaggio & C. S.p.A., Pontedera, Pisa (IT)

( * ) Notice: Subject to any disclaimer, the term of this patent is extended or adjusted under 35 U.S.C. 154(b) by 0 days.

(21) Appl. No.: 11/220,981

(22) Filed: Sep. 7, 2005

(65) Prior Publication Data

US 2006/0055355 A1 Mar. 16, 2006

(30) Foreign Application Priority Data

Sep. 8, 2004 (IT) .......................... MI2004A1710

(51) Int. Cl.
*G05D 3/00* (2006.01)
(52) U.S. Cl. .......................... 318/466; 318/467; 318/9; 318/139
(58) Field of Classification Search ..................... None
See application file for complete search history.

(56) References Cited

U.S. PATENT DOCUMENTS

| | | | | |
|---|---|---|---|---|
| 4,129,040 A | * | 12/1978 | Hayden, Jr. .................. | 73/507 |
| 5,435,590 A | * | 7/1995 | Larsson ................. | 280/93.502 |
| 5,789,881 A | * | 8/1998 | Egami et al. ............... | 318/139 |
| 6,443,126 B1 | * | 9/2002 | Morimoto et al. ...... | 123/339.15 |

* cited by examiner

*Primary Examiner*—Lincoln Donovan
*Assistant Examiner*—Renata McCloud
(74) *Attorney, Agent, or Firm*—Hedman & Costigan PC; James V. Costigan

(57) ABSTRACT

Electronic control system for an actuation device of operating groups of a vehicle comprising an electronic gearcase that allows the activation and deactivation of said at least one device to be managed. The gearcase defines a first operating condition of the selective actuations defined as rest, a second condition defined as block and a third condition defined as transitional, which is a passage step between the other two conditions.

12 Claims, 4 Drawing Sheets

——————— Actuation
——————— Control
- - - - - - - Double click
—·—·—·— Anomalous actuation
—··—··—··— Switching spontaneous state
—•—•—•— Failure
—◦—◦—◦— Timer

ELECTRONIC CONTROL SYSTEM FOR OPERATING GROUPS OF A VEHICLE

The present invention refers to an electronic control system of a selective actuation device, or parking device, for vehicles having interlinked operating groups, like for example anti-roll systems, devices for stopping the stroke of the suspension and brake unit.

In the field of two and four-wheeled vehicles a substantial diversification of models has been proposed, in particular there is increasing interest in "hybrid" vehicles that combine the characteristics of motorcycles, in terms of handling, with the stability of four-wheeled vehicles.

Such models represented, for example, by three-wheeled vehicles equipped with two front steering wheels, and four-wheeled vehicles known by the name QUAD.

In these vehicles, which are increasingly complex, it is necessary to foresee various interlinked operating groups, like for example anti-roll systems, devices for stopping the stroke of the suspension and brakes.

These operating groups constitute the parking group.

Indeed, it is possible that during some manoeuvres, for example during temporary stops for parking or at traffic lights it is necessary to actuate the aforementioned parking group, to avoid overbalancing that can cause the driver to fall off. During normal operation of the vehicle, on the other hand, it is necessary for the brakes to be able to be actuated independent of any other group.

The selective actuation device is used to decouple a first operating group from a second operating group in a first travelling condition of the vehicle and to link the first operating group with the second operating group in a second travelling condition of the vehicle.

The Applicant has set itself the problem of coordinating the operation of a selective actuation device for a plurality of operating groups of a vehicle, like for example anti-roll control, devices for stopping the stroke of the suspension and brakes, constituting the parking group.

The Applicant has made an electronic control system for selective actuations of operating groups comprising an electronic gearcase that allows the activation and deactivation for example of a rolling block and/or of a group for stopping the stroke of the suspension to be managed.

The gearcase substantially defines a first operating condition of the selective actuations defined as rest, a second condition defined as block, a third condition defined as transitional, which is a passage step between the other two conditions, a failure condition and an undetermined operation condition.

An aspect of the present invention concerns an electronic control system for at least one actuation device of at least one operating group of a vehicle comprising an electronic gearcase that allows the activation and deactivation of said at least one device to be managed, characterised in that said gearcase defines a first operating condition of the selective actuations defined as rest state, a second condition defined as block state and at least a third condition defined as transitional state, which is a passage step between the other two conditions, from which it is possible to pass into a further failure state or into at least an undetermined state.

The characteristics and advantages of the electronic control system according to the present invention shall become clearer from the following description, given as a non-limiting example, referring to the attached schematic drawings, in which:

FIG. 1 schematically illustrates the control system according to the present invention.

With reference to the quoted figures, the electronic control system according to the present invention comprises an electronic processing gearcase 2, which receives detection signals from a plurality of sensors and sends at least one command signal for at least one of said operating groups of the vehicle.

The system also comprises an electric motor 21 forming part of an actuator for at least one of said operating groups.

Figure 1:
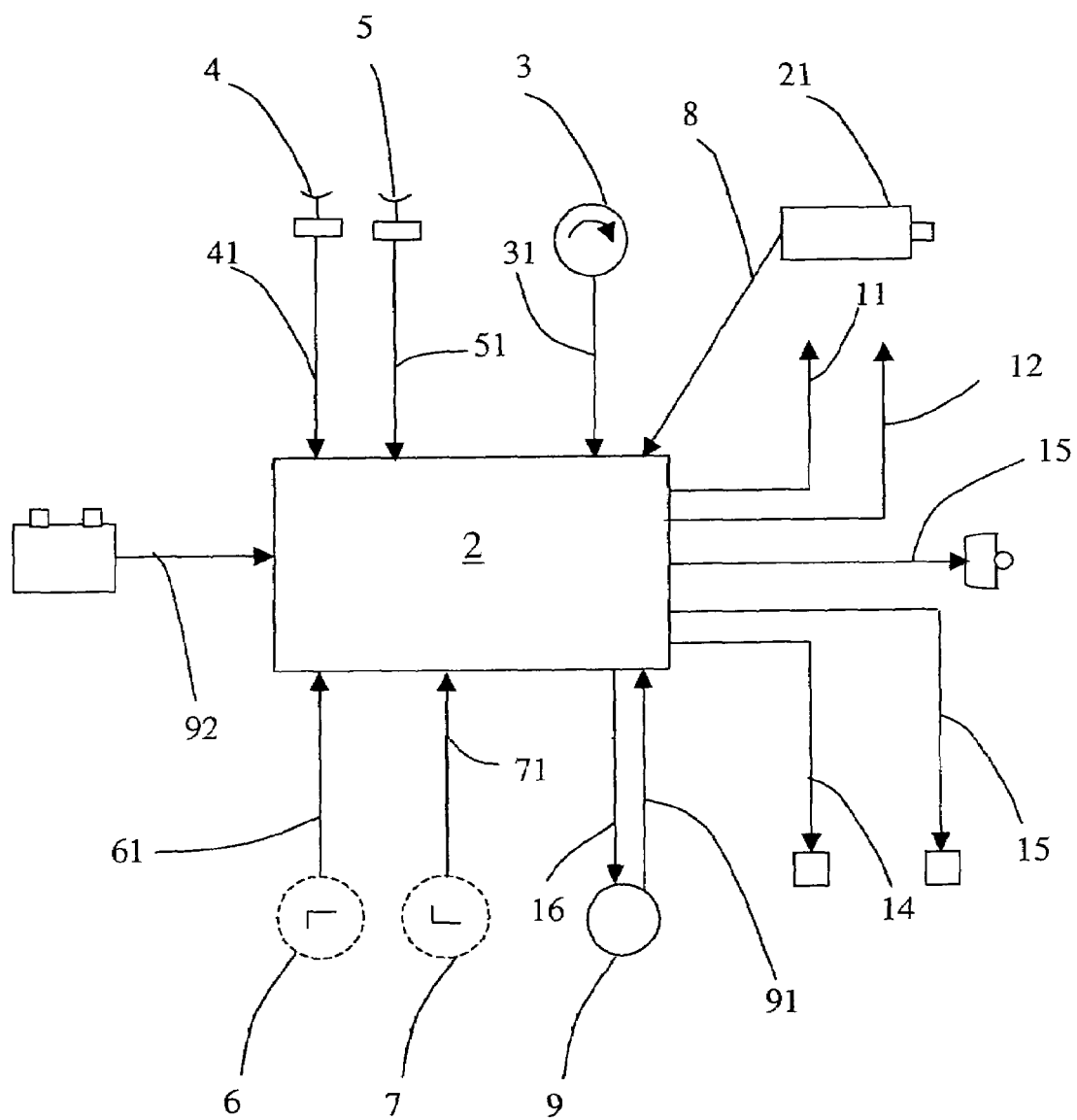

In the example illustrated in FIG. 1, the system comprises a speed sensor 3 for each front wheel of the vehicle from which a corresponding speed signal 31 is detected for each front wheel, a gas handle control sensor 4 from which a corresponding gas signal 41 is detected, a control sensor 5 from which a corresponding command signal 51 is detected, an "up" limit switch sensor 6 with which an "up" limit switch signal 61 is associated, a "down" limit switch sensor 7 with which a "down" limit switch signal 71 is associated, a current measurement sensor of the electric motor 8, a sensor 9 for measuring the number of revolutions of the motor with which a signal of the number of revolutions 91 is associated and a signal relative to the under-key battery 92.

Such UP and DOWN limit switch sensors substantially constitute an operating condition detection sensor (rest, block or transitional).

The illustrated command signals comprise an UP state/OFF state deviator command signal 11 for the electric motor, a DOWN state/OFF state deviator command signal 12 for the electric motor, system state indicator light signal 13, system failure indicator light signal 14, sound warning signal 15 and flywheel Pick-up signal 16 (for limitation of motor revolutions).

Such deviator command signals 11 and 12 constitute control signals for the change of operating condition. The electronic gearcase identifies an operating condition or state of the various groups of the vehicle and identifies at least two logic states identified based upon the signals 61 and 71 received by the two UP and DOWN limit switches.

The possible states comprise a DOWN rest state R, an UP actuated block state B and a transitional state T1 or T2 that is a passage step between the other two states. From said transitional state it is also possible to pass to a failure state A and to at least one undetermined state I1 or I2.

Figure 2:
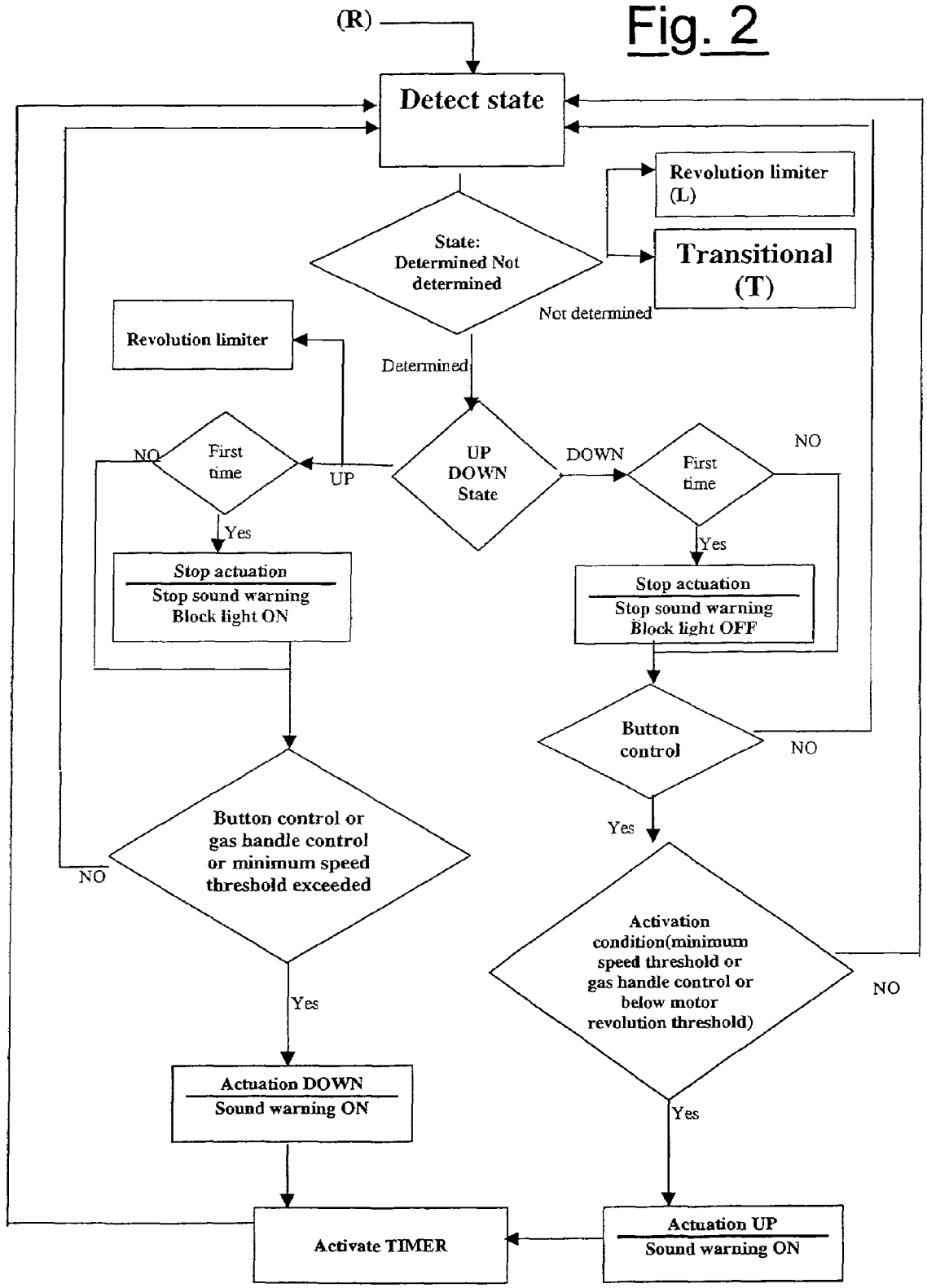
FIG. 2 illustrates a flow diagram of the main operations carried out by the control system according to the present invention.

FIG. 2 illustrates a flow diagram of the main operations carried out by the monitoring and control system of the state of the system.

The DOWN rest state is characterised by the closed Down limit switch signal.

The selective actuation device, or parking device, is not actuated and the state light is off; moreover, a function for the limitation of the number of revolutions of the motor is inactive.

The relays are not excited and their outputs are such as to place the electric motor 21 in short-circuit.

It is only possible to pass into the block state if both of the speed sensors 3 indicate a value lower than a predetermined threshold (preselectable), the gas handle control is in rest position and the frequency of the impulses of the sensor of the number of revolutions of the motor 9 (pick-up) is below a certain (settable) threshold.

Only if this is the case, the system is sensitive to switching of the deviator control button 11 from OFF to ON, otherwise each time the button is switched has no effect.

If all of the aforementioned conditions have occurred, with the switching of the button (OFF-ON) the electric motor 21 is actuated (in the suitable way of rotation), since the gearcase suitably selects the outputs for the control of the relays. In such a case the sound warning 15 is also actuated.

The UP actuated block state is the state of the system characterised by the closed Up limit switch. In such a state of the system the parking device is actuated and the state light is lit; moreover, the function of limitation of the number of revolutions of the motor is active. The relays are not excited and their outputs are such as to place the motor in short-circuit.

It is possible to pass into the rest state with two different options:

actuating the gas handle control (the gearcase is sensitive to the logic state of the sensor on gas handle control 4);

acting on the control button switching OFF-ON.

In both cases, after a possible delay (which can be set by the gearcase), the electric motor 21 is actuated (in the suitable way of rotation). In such a condition the sound warning is also actuated.

In the case in which, whilst having carried out neither of the two manoeuvres described above, at least one of the two speed sensors of the front wheels indicates that a certain threshold has been exceeded (e.g. starting downhill), then the electric motor is actuated (in the suitable way of rotation to obtain the unblocking of the system).

The transitional state comprises a first transitional state T1 that refers to the passage from the rest state to the actuated block state and a second transitional state T2 that refers to the passage from the actuated block state to the rest state: in particular, the system goes into transition as soon as the gearcase has ascertained the actuation control. In such a state the electric motor is actuated (in the suitable way of rotation), since the gearcase suitably feeds the motor through the motor control outputs.

As soon as the DOWN limit switch is released, the gearcase goes into the first transitional state T1, unless one of the following conditions has occurred previously:

a current overload has occurred, measured inside the gearcase (the current threshold can be set); the system evolves in said failure state.

the maximum actuation time has been exceeded (the time threshold can be set); the system evolves in said failure state.

the two limit switches are both closed; the system evolves in the undetermined state I1; the actuation of the electric motor continues unless the system has reached the block state (indicated by the limit switches) or a current overload has occurred and the system evolves in the failure state, or the maximum actuation time has been exceeded and the system evolves in the failure state.

As soon as the UP limit switch is released, the gearcase goes into the second transitional state T2, unless one of the following conditions has occurred previously:

a current overload has occurred, measured inside the gearcase (the current threshold can be set); the system evolves in said failure state.

the maximum actuation time has been exceeded (the time threshold can be set); the system evolves in said failure state.

the two limit switches are both closed; the system evolves in the undetermined state I2; the actuation of the electric motor continues unless the system has reached the block state (indicated by the limit switches) or a current overload has occurred and the system evolves in the failure state, or the maximum actuation time has been exceeded and the system evolves in the failure state.

Figure 3:
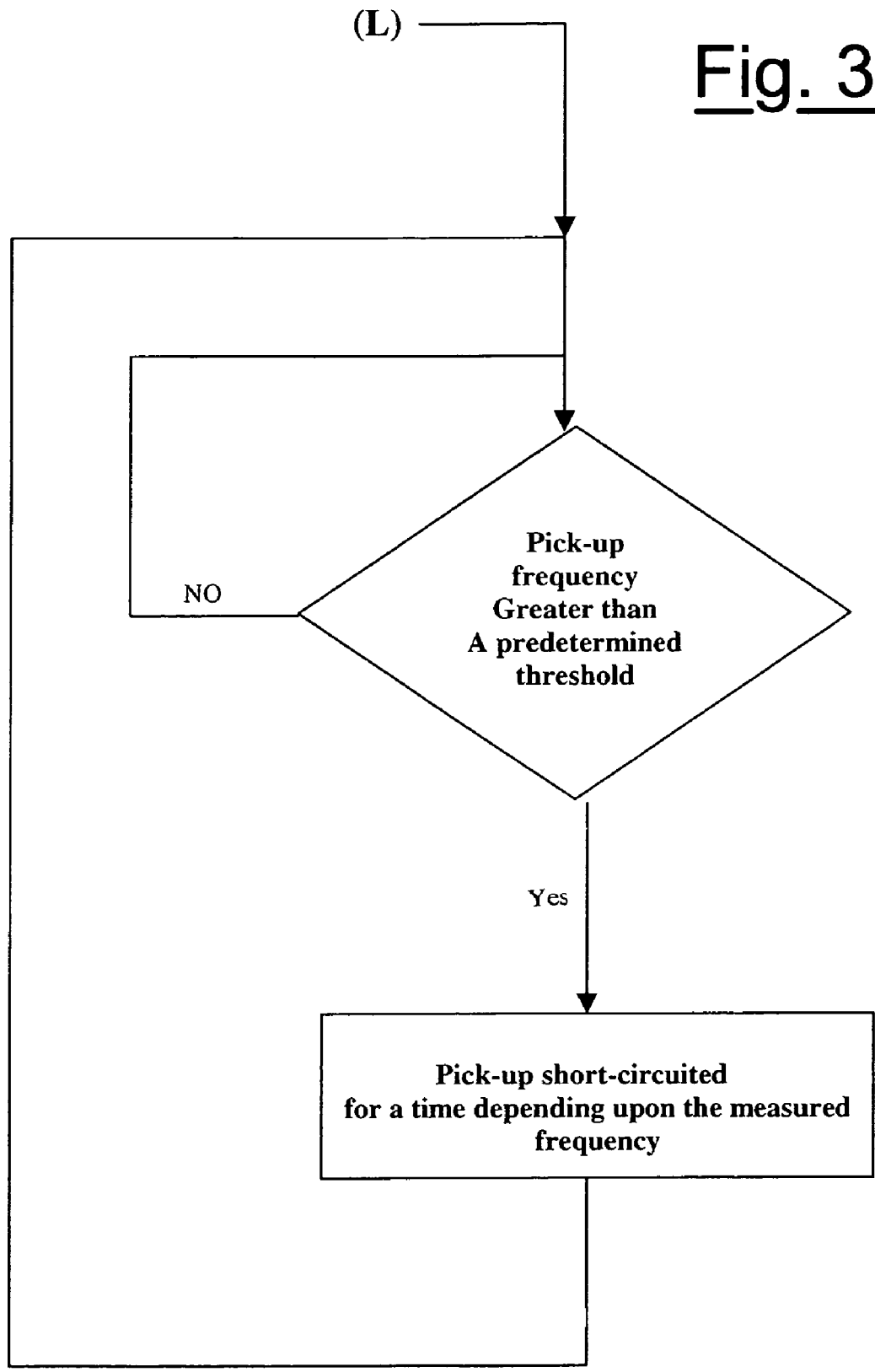
FIG. 3 illustrates a flow diagram of the operations carried out by the control system during the step of limitation of revolutions according to the present invention.

In general, when the actuation has not ended with a stable state (rest or block) being reached, the gearcase goes into the failure state. The control outputs for the electric motor are such as to place the motor in short-circuit. In this state the gearcase actuates the function of "limitation of motor revolutions" illustrated as an example in the flow diagram of FIG. 3, which acts upon the sensor of the number of revolutions evaluating the frequency of the impulses from which the value of the motor-revolutions is worked out.

The actuation strategy is the following: if the time interval between two consecutive positive peaks is less than a certain threshold (high motor-revolutions), then the pick-up is mass short-circuited for a certain time (such a time can be variable according to the measured interval); when this time has passed, or if in the meantime the rest state has been reached, the pick-up is no longer short-circuited. If the conditions continue, the procedure remains active and thus waits for another two consecutive peaks of the pick-up and actuates the same strategy described above.

Figure 4:
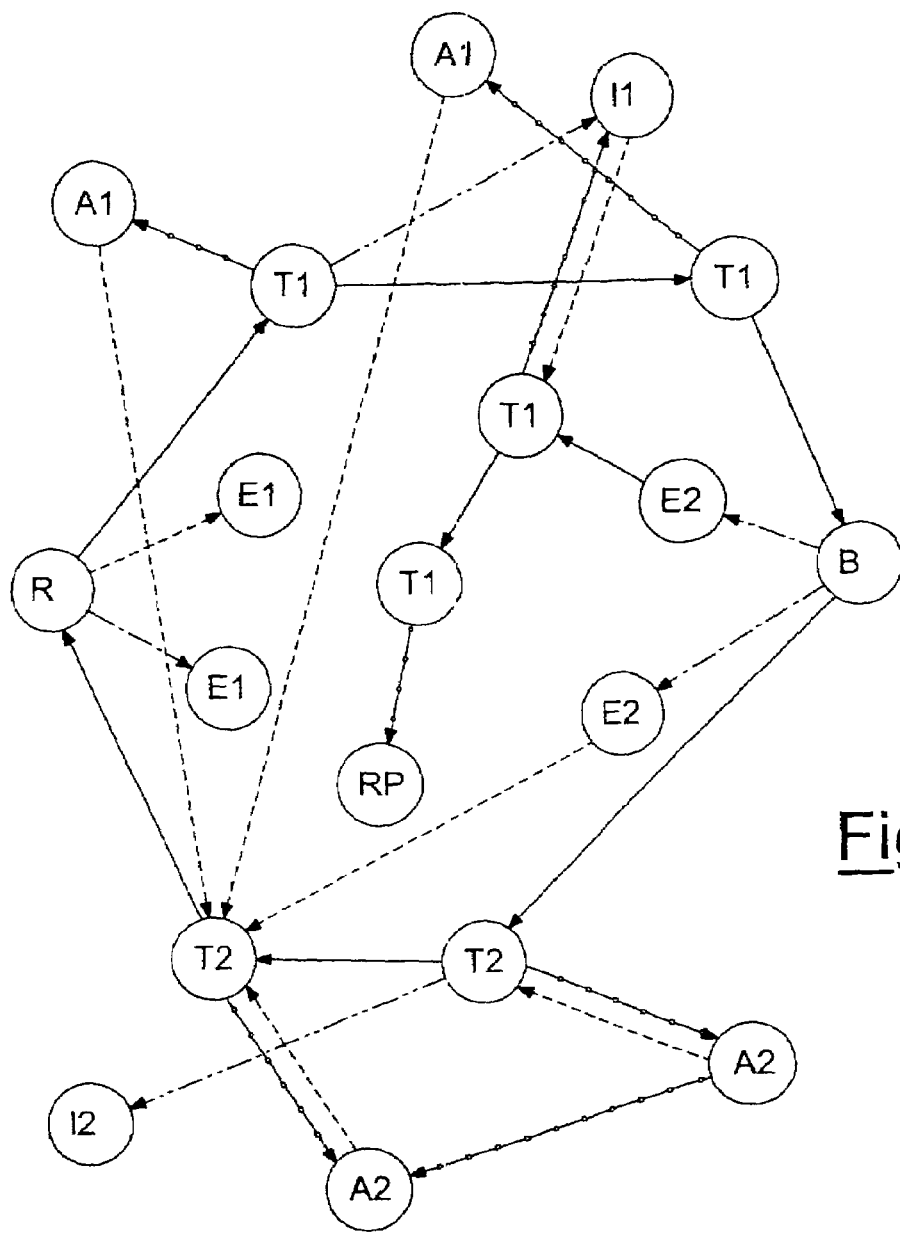
FIG. 4 illustrates a transition graph between the states carried out by the control system according to the present invention.

In FIG. 4, which illustrates a graph of the transitions between the various states of the system, it can be seen that there are further states, like the two error states E1 and E2, and an unblock state Rp.

Once the failure state has been reached, the system remains waiting for a single command: the "double-click" on the control button. The previously recorded failure could indeed be just momentary, for which reason in this way it is attempted to reset the functionality of the system. The double-click is interpreted as a request to go into rest state R, therefore the gearcase suitably feeds the motor and goes back into transitional state, according to the detail of the transition graph between the states.

Moreover, the two undetermined substates I1 and I2 can be distinguished, of which the first I1 is reached during an actuation from the rest state towards the block state so that at a certain point both of the limit switches are closed; it is presumed that the incorrect indication is that of the DOWN limit switch (staying closed due to a failure) and therefore that the parking device is actuated. The state light is lit. The electric motor control outputs are such as to place the motor in short-circuit and in this state the gearcase actuates the function of "limitation of motor revolutions". The warning light is lit.

Moreover, it is possible to pass into the unblock state Rp with the same options foreseen in the locking state to go into rest state, for example by actuating the gas handle control (the gearcase is sensitive to the logic state of the button on gas handle control) or by acting upon the control button with switching off-on, or the gearcase receiving suitable indications from the sensors of the system.

The system goes into unblock state "rp" after predetermined seconds from the release of the UP limit switch, otherwise the state I1 is not abandoned.

The second undetermined state I2 is reached during an actuation by the block state towards the rest state, so that at a certain point both of the limit switches are closed; it is presumed that the incorrect indication is that of the UP limit switch (staying closed due to a failure) and therefore that the parking device is not actuated. The electric motor control outputs are such as to place the motor itself in short-circuit.

The state light is off, the warning light flashes and the buzzer buzzes intermittently. The function of "limitation of motor revolutions" is not active.

The first error state E1 is reached due to a variation of the logic states of the two limit switches not as a consequence of an actuation being carried out, starting from the rest state. The state light is lit, the electric motor control outputs are such as to place the motor itself in short-circuit and the warning light is lit. Moreover, in this state the gearcase actuates the "limitation of motor revolutions" function.

The second error state E2 is reached due to a variation of the logic states of the two limit switches not as a consequence of an actuation being carried out, starting from the block state. The state light is lit, the electric motor control outputs are such as to place the motor itself in short-circuit and the warning light is lit. Moreover, in this state the gearcase actuates the "limitation of motor revolutions" function.

From such a condition the only accepted command is the double-click, which has the effect of taking the gearcase into transitional state T1 or T2.

Moreover, the gearcase through a suitable line can set and read all of the threshold values, all of the parameters and every condition of the state of the system.

The gearcase can also carry out an active diagnosis of the system with reading and cancellation of the errors.

The invention claimed is:

1. Electronic control system for at least one actuation device of at least one operating group of a vehicle comprising an electronic gearcase that allows the activation and deactivation of said a least one device to be managed, characterized in that said gearcase defines a first operating condition of selective activations defined as rest state, a second condition defined as block state and at least a third condition defined as transitional state, which is a passage step between the said first and said second operating conditions, through which said gearcase may pass into a further failure state or into at least an undetermined state wherein said control gearcase receives detection signals from a plurality of sensors and sends at least one control signal for at least one of said operating groups of the vehicle and wherein said plurality of sensors comprises a sensor for detecting said operation condition, a current measurement sensor for electric motor (8), a sensor (9) for measuring revolutions of the motor with which a signal for the number of revolutions (91) is associated and a signal relative to under-key battery (92) and wherein said sensor for detecting said operation condition comprises an "up" limit switch sensor with which an "up" limit switch signal is associated and a "down" limit switch sensor with which a "down" limit switch signal is associated.

2. Electronic control system according to claim 1, wherein said transitional state comprises a first transitional state (T1) that refers to the passage from the rest state to an actuated block state and a second transitional state (T2) that refers to the passage from the actuated block state to the rest state.

3. Electronic control system according to claim 1, wherein said at least one control signal determines a transition from the rest condition to the block condition and vice-versa.

4. Electronic control system according to claim 1, wherein said gearcase determines a condition defined as limitation of revolutions in which the number of revolutions of a motor of the vehicle is predetermined.

5. Electronic control system according to claim 1, wherein said undetermined state comprises a first undetermined sub-state (I1) that is reached during an actuation from the rest state towards the block state and a second undetermined sub-state (I2) that is reached during an actuation from the block state towards the rest state.

6. Electronic control system according to claim 1, wherein said control signal is sent to an actuator actuated by an electric motor.

7. Electronic control system according to claim 1, wherein said plurality of sensors comprises a speed sensor for every front wheel of the vehicle from the which a corresponding speed signal is detected for each front wheel, a gas handle control sensor from which a corresponding gas signal 4 is detected and a control sensor (5).

8. Electronic control system according to claim 1, wherein said at least one control signal comprises at least one of the group consisting of a system state light indicator signal, a system failure light indicator signal, a sound warning signal and a flywheel pick up signal (16).

9. Electronic control system according to claim 1, wherein said at least one operating group comprises an anti-roll device.

10. Electronic-c control system according to claim 1, wherein said at least one operating group comprises a device for stopping a suspension stroke.

11. Electronic control system according to claim 1, further comprising a first error state (E1) that is reached due to a variation in the logic states of two limit switches and not as a consequence of an actuation being carried out, starting from the rest state.

12. Electronic control system according to claim 11, further comprising a second error state (E2) that is reached due to a variation in the logic states of the two limit switches not as a consequence of an actuation being carried out, starting from the block state.

* * * * *